UNITED STATES PATENT OFFICE.

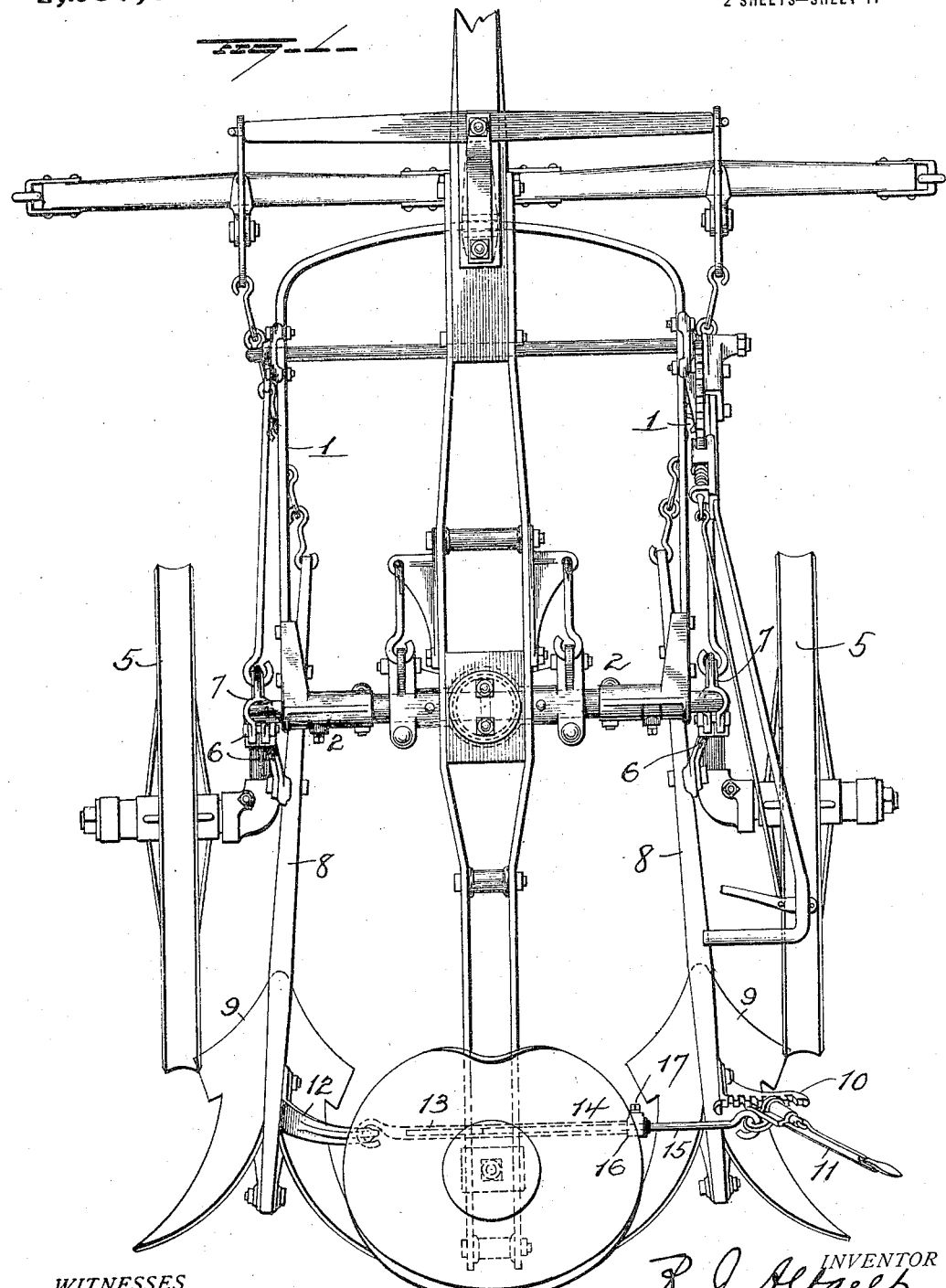

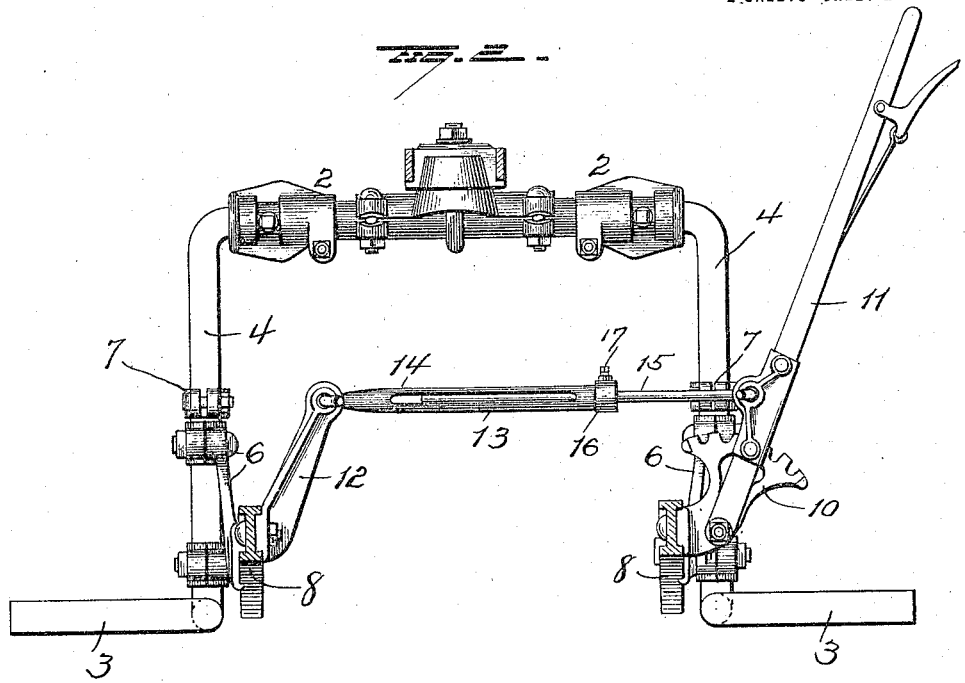

RUDOLPH J. ALTGELT, OF SOUTH BEND, INDIANA, ASSIGNOR TO OLIVER CHILLED PLOW WORKS, OF SOUTH BEND, INDIANA.

CULTIVATOR.

1,237,854.  Specification of Letters Patent.  Patented Aug. 21, 1917.

Original application filed February 26, 1915, Serial No. 10,786. Divided and this application filed September 20, 1915. Serial No. 51,659.

*To all whom it may concern:*

Be it known that I, RUDOLPH J. ALTGELT, a citizen of the United States, and a resident of South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

This invention relates to improvements in cultivators, the same being a division of application for patent filed by me on the 26th day of February, 1915, and designated by Serial Number 10,786.

The object of my present invention is to provide simple and efficient means for swinging the cultivator beams laterally and for adjusting them laterally with respect to each other.

With these and other objects in view, the invention consists in certain novel features of construction and combinations of parts as hereinafter set forth and pointed out in the claim.

In the accompanying drawings; Fig. 1 is a plan view showing the application of my improvements to a cultivator, and Fig. 2 is a rear view.

1 represents the horizontal frame of a cultivator mounted at its rear end upon an arch axle 2. The arch axle may be made in two parts connected adjustably with the frame, as explained in my copending application, No. 10,786, and the spindles 3 at the lower ends of the upright portions 4 of the arch axle are mounted in the hubs of carrying wheels 5.

Brackets 6 are loosely or pivotally mounted on the upright portions 4 of the arch axle so as to be capable of swinging horizontally thereon and prevented from vertical displacement by stops 7. The brackets 6 are secured to cultivator beams 8 rearwardly of the forward ends of the latter and said beams 8 are provided at their rear ends with suitable soil-engaging members 9.

By mounting the cultivator beams as above explained, they will be so connected with the upright portions of the crank-axle members that they may have a horizontal swinging movement imparted to them. This will enable such adjustment of the beams that the plow bodies may be moved laterally, and also adjusted relatively to each other, so that the cultivator may be made adaptable for cultivating rows of different widths,—for instance, rows of from 24 to 30 inches in width. Such adjustment for width is also facilitated by the fact that the beams are attached to crank-axle members which are laterally adjustable by reason of the longitudinal adjustability of their upper arms with relation to the rear cross bar of the frame.

For the purpose of swinging the beams horizontally on their pivotal connections with the crank-axle members, the devices now to be described are employed.

A toothed segment 10 is secured to one of the beams 8 and to the frame of this segment, a hand lever 11 is pivoted and provided with the usual manually operable detent to engage the teeth of the segment. An upwardly projecting arm 12 is secured to the other beam 8, and an adjustable connecting rod 13 connects this arm with the lever 11. The connecting rod 13 comprises two telescoping members 14—15 to permit the longitudinal adjustment of said rod and the member 14 is provided with a collar 16 through which a set screw 17 passes and engages the member 15 to hold the two members at the desired adjustment. By making the connecting rod 13 extensible, the lateral adjustment of the beams effected by the lateral adjustment of the crank-axle members as above explained, will be facilitated.

When the lever 11 is operated, motion will be imparted to swing the beams horizontally on their pivotal connections with the vertical portions of the crank-axle members, and the plow bodies may be adjusted laterally to change the distance between them and be brought nearer to or farther from the plants by moving the lever 11 relating to the segment, while the cultivator is in operation.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

Spreading means for cultivators, comprising an arm adapted to be secured to one beam, a segment adapted to be secured to another beam, a lever pivoted to said segment, telescoping members connecting said arm and lever, and means for securing said telescoping members at any desired adjustment relatively to each other.

In testimony whereof, I have signed this specification in the presence of two subscribing witnesses.

RUDOLPH J. ALTGELT.

Witnesses:
VERU VAN DUSER,
GERHARD BEHUKE.

Copies of this patent may be obtained for five cents each, by addressing the "Commissioner of Patents, Washington, D. C."